US009431834B2

United States Patent
Keeling et al.

(10) Patent No.: US 9,431,834 B2
(45) Date of Patent: Aug. 30, 2016

(54) WIRELESS POWER TRANSFER APPARATUS AND METHOD OF MANUFACTURE

(71) Applicant: QUALCOMM Incorporated, San Diego, CA (US)

(72) Inventors: Nicholas A Keeling, Auckland (NZ); Edward Van Boheemen, Auckland (NZ); Michael Kissin, Auckland (NZ); Jonathan Beaver, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 536 days.

(21) Appl. No.: 13/671,447

(22) Filed: Nov. 7, 2012

(65) Prior Publication Data

US 2013/0249477 A1    Sep. 26, 2013

Related U.S. Application Data

(60) Provisional application No. 61/613,392, filed on Mar. 20, 2012.

(51) Int. Cl.
  *H02J 7/00* (2006.01)
  *H01F 27/02* (2006.01)
  *H01F 38/14* (2006.01)
  (Continued)

(52) U.S. Cl.
  CPC ............ *H02J 7/0042* (2013.01); *H01F 27/02* (2013.01); *H01F 38/14* (2013.01); *H01F 41/00* (2013.01); *H02J 7/025* (2013.01); *Y10T 29/49002* (2015.01)

(58) Field of Classification Search
  CPC ...................................................... H02J 7/025
  USPC ........................................................ 320/108
  See application file for complete search history.

(56) References Cited

U.S. PATENT DOCUMENTS 3,902,147 A     8/1975  Trench
4,234,865 A    11/1980  Shigehara
(Continued)

FOREIGN PATENT DOCUMENTS

CN     1411009 A    4/2003
CN     1950914 A    4/2007
(Continued)

OTHER PUBLICATIONS

International Search Report and Written Opinion—PCT/US2013/029376—ISA/EPO—Jun. 20, 2013.
(Continued)

*Primary Examiner* — Edward Tso
*Assistant Examiner* — Ahmed Omar
(74) *Attorney, Agent, or Firm* — Knobbe Martens Olson & Bear LLP

(57) ABSTRACT

Systems, methods and apparatuses for wireless power transfer are disclosed. In one aspect, a wireless power transfer apparatus is provided comprising a casing with at least one projecting member projecting from an inner side of the surface of the casing that is subject to external compression forces. An induction coil and other components such as insulating layers and magnetically permeable members are positioned around at least one of the projecting members and maintained in position by the projecting members. The wireless power transfer apparatus is able to withstand large compressive forces, such as those imparted by heavy vehicles and the like passing over the apparatus when positioned on the ground in a wireless power transfer system.

22 Claims, 5 Drawing Sheets

(51) Int. Cl.
*H01F 41/00* (2006.01)
*H02J 7/02* (2016.01)

(56) References Cited

U.S. PATENT DOCUMENTS

| | | | |
|---|---|---|---|
| 4,538,863 A | 9/1985 | Allen et al. | |
| 4,623,865 A | 11/1986 | Kiesel et al. | |
| 4,800,328 A | 1/1989 | Bolger et al. | |
| 6,198,373 B1 | 3/2001 | Ogawa et al. | |
| 6,239,682 B1 | 5/2001 | McCloskey | |
| 6,333,573 B1 | 12/2001 | Nakamura | |
| 6,768,409 B2 | 7/2004 | Inoue et al. | |
| 6,784,778 B2 | 8/2004 | Stitz et al. | |
| 6,794,975 B2 | 9/2004 | Iwao et al. | |
| 7,154,204 B2 | 12/2006 | Koenig | |
| 7,280,022 B2 | 10/2007 | Shinmen et al. | |
| 7,595,571 B2 | 9/2009 | Thirunarayan-Kumar et al. | |
| 7,986,059 B2 | 7/2011 | Randall | |
| 8,035,255 B2 | 10/2011 | Kurs et al. | |
| 8,042,742 B2 | 10/2011 | Kagaya et al. | |
| 8,174,234 B2 | 5/2012 | Julstrom et al. | |
| 8,525,868 B2 | 9/2013 | Forutanpour et al. | |
| 2004/0124958 A1 | 7/2004 | Watts et al. | |
| 2006/0104006 A1 | 5/2006 | Toshiharu | |
| 2006/0133622 A1 | 6/2006 | Chen | |
| 2007/0222426 A1 | 9/2007 | Waffenschmidt et al. | |
| 2007/0287508 A1 | 12/2007 | Telefus | |
| 2008/0129246 A1 * | 6/2008 | Morita | B60L 5/005 320/108 |
| 2009/0096413 A1 | 4/2009 | Partovi et al. | |
| 2009/0160262 A1 | 6/2009 | Schmidt et al. | |
| 2009/0273242 A1 | 11/2009 | Cook | |
| 2009/0289752 A1 | 11/2009 | Katsunori | |
| 2010/0264872 A1 | 10/2010 | Kwong | |
| 2010/0277121 A1 | 11/2010 | Hall et al. | |
| 2010/0314946 A1 | 12/2010 | Budde et al. | |
| 2011/0062806 A1 | 3/2011 | Ohashi et al. | |
| 2011/0162881 A1 | 7/2011 | Schipporeit | |
| 2011/0187317 A1 * | 8/2011 | Mitake | B60L 5/005 320/108 |
| 2011/0234028 A1 | 9/2011 | Iwasaki et al. | |
| 2011/0316475 A1 | 12/2011 | Jung et al. | |
| 2012/0020485 A1 | 1/2012 | Visser et al. | |
| 2012/0026837 A1 | 2/2012 | Li et al. | |
| 2012/0074899 A1 | 3/2012 | Tsai et al. | |
| 2012/0091950 A1 | 4/2012 | Campanella et al. | |
| 2012/0119698 A1 | 5/2012 | Karalis et al. | |
| 2012/0161696 A1 | 6/2012 | Cook et al. | |
| 2012/0224456 A1 | 9/2012 | Visser et al. | |
| 2013/0249303 A1 | 9/2013 | Keeling et al. | |
| 2013/0249304 A1 | 9/2013 | Keeling et al. | |
| 2013/0300202 A1 | 11/2013 | Keeling et al. | |
| 2016/0027577 A1 | 1/2016 | Keeling et al. | |

FOREIGN PATENT DOCUMENTS

| | | | |
|---|---|---|---|
| CN | 101454957 A | 6/2009 | |
| CN | 101490923 A | 7/2009 | |
| CN | 102089952 A | 6/2011 | |
| DE | 19839458 | 3/2000 | |
| DE | 102006025458 A1 * | 12/2007 | H01F 38/14 |
| DE | 102006025458 A1 | 12/2007 | |
| DE | 102010050935 A1 | 9/2011 | |
| EP | 1298683 A2 | 4/2003 | |
| JP | 2001008380 A | 1/2001 | |
| WO | 2009123432 A2 | 10/2009 | |
| WO | WO-2009151818 | 12/2009 | |
| WO | 2010090538 A1 | 8/2010 | |
| WO | 2010090539 A1 | 8/2010 | |

OTHER PUBLICATIONS

Wikipedia : "Heat-shrink Tubing", as published Mar. 10, 2012, retrieved via archive.org/web at<http://web.archive.Org/web/20120310052307/http://en.wikipedia.org/wiki/Heat-shrink_tubing&tubing>, 3 pages.

* cited by examiner

WIRELESS POWER TRANSFER APPARATUS AND METHOD OF MANUFACTURE

CROSS-REFERENCE TO RELATED APPLICATIONS

This is a non-provisional application claiming priority to and the benefit of U.S. Provisional Application No. 61/613,392, filed Mar. 20, 2012, which is herein incorporated by reference in its entirety.

TECHNICAL FIELD

The technical field relates generally to wireless power transfer, and more specifically to devices, systems, and methods related to wireless power transfer to remote systems such as battery-powered vehicles. In particular, the field relates to arrangements of a wireless power transfer apparatus for use in a wireless power transfer system and its method of manufacture.

BACKGROUND

Remote systems, such as vehicles, have been introduced that include locomotion power derived from electricity received from an energy storage device such as a battery. For example, hybrid electric vehicles include on-board chargers that use power from vehicle braking and motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks.

Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles are desirable.

Wireless power transfer systems may utilize inductive power transfer (IPT). In IPT, power is transferred from a base or primary power device to a pick-up or secondary power device. Typically, each device includes one or more windings of electric current conveying media, such as wires, so are commonly referred to as coils. Inductive power devices used for supplying wireless power to electric vehicles may be subject to harsh conditions both in terms of impact and compressive forces and also in terms of exposure to the elements, especially water. This is particularly the case for wireless power transfer systems in which the base power device is positioned on the ground and may frequently be driven over by vehicles. A pick-up coil on the underside of a vehicle may also be subject to impacts from road surfaces and the like. Accordingly, a need exists for wireless power transfer devices that are strong, robust and capable of withstanding the conditions to which they are subjected. It is also generally desirable for a wireless power transfer device to have a structure that provides ease of assembly and an associated reduction in manufacturing complexity and costs.

SUMMARY

Various implementations of systems, methods, and devices within the scope of the appended claims each have several aspects intended to address at least one of the foregoing objectives, with no single aspect being solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless power transfer apparatus operable to transmit or receive wireless power. The apparatus of some embodiments includes, for example, a first casing portion having a wall with a projecting member extending from an inner surface of the wall, a coil extending around the projecting member, the coil configured to wirelessly receive and/or transmit power, and a second casing portion connected to the first casing portion to form a chamber within which the coil is housed. In some embodiments, the wall of the first casing portion is configured to withstand external compression forces, such as, for example, forces applied by motor vehicles driving over the wall of the first casing portion. In some embodiments, the projecting member abuts an inner side of the second casing portion and is formed of a material able to withstand external compression forces that may be applied to the wall of the first casing portion during use. In other embodiments, the projecting member and an inner surface of the second casing portion come into contact when the wall of the first casing portion deforms under an external compression force. In some embodiments, the projecting member is integrally formed with the first casing portion. In some embodiments, the coil is wound around the projecting member. In some embodiments, the coil is wound around a plurality of projecting members extending from the inner surface of the wall of the first casing portion. In some embodiments, the projecting member is a pillar. The apparatus of some embodiments further includes, for example, a component located within the chamber and held in position by the projecting member, the component selected from the group comprising: a magnetically permeable member, an electrically insulating member, or a physical protection member.

In another aspect, the disclosure provides a wireless power transfer apparatus operable to transmit or receive wireless power. The apparatus of some embodiments includes, for example: first casing means for defining a portion of a chamber, the first casing means having an inner surface; means for providing internal structural support located on and projecting from the inner surface of the first casing means; means for conveying electric current, wherein the means for conveying electric current is positioned to extend around the means for providing internal structural support and is configured to wirelessly receive and/or transmit power; and second casing means for defining a further portion of the chamber, the second casing means secured to the first casing means to form the chamber for housing the means for conveying electric current. In some embodiments, the means for providing internal structural support abuts an inner surface of the second casing means at least when an external compression force applied to an outer surface of the first casing means causes the first casing means to deform. In such embodiments, the means for providing internal structural support is configured to withstand external compression forces applied to the outer surface of the first casing means. In some embodiments, the means for providing internal structural support is integrally formed with the first casing means. In some embodiments, the means for conveying electric current is wound around the means for providing internal structural support. The apparatus of some embodiments, further includes, for example, a component held in position by the means for providing internal structural support. In some embodiments, the component is selected from the group comprising: means for strengthening formation of an electromagnetic field; means for electrically insulating the means for conveying electric current; and means for physically protecting the means for conveying electric current.

In various embodiments, the first and second casing means may include two portions of a casing, housing, outer shell, or other protection unit. The means for providing internal structural support may include, for example, internally located pillars, columns, walls, support beams, and the like. The means for conveying electric current may include, for example, multi-turn coils, loop antennas, and other induction coils. The means for strengthening formation of an electromagnetic field, present in some embodiments, may include, for example, ferromagnetic antenna cores or magnetically permeable members. In various embodiments, a means for electrically insulating may be present and may include, for example, one or more layers of insulating material(s), which are positioned between the induction coil(s) and other magnetic components. Additionally or alternatively, the means for electrically insulating may include, for example, one or more layers of insulating material(s) coating one or more sides of the other magnetic components. In some embodiments, a means for physically protecting the induction coil may additionally or alternatively be added. The means for physically protecting the induction coil may include, for example, one or more layers of material(s) selected to physically protect the coil from the potentially sharp edges of the other magnetic components.

In another aspect, the disclosure provides a method of manufacturing a wireless power transfer apparatus. In some embodiments, the method includes, for example, positioning a coil around a projecting member extending from an inner surface of a wall of a first casing portion, the coil configured to wirelessly receive and/or transmit power and the wall configured to withstand external compression forces, and connecting a second casing portion to the first casing portion to form a chamber within which the coil is housed. In some embodiments, positioning the coil around the projecting member comprises winding a length of conducting material around the projecting member. In some embodiments, the method further includes positioning a component on top of the coil such that the component is held in position by the projecting member before connecting the second casing portion to the first casing portion.

BRIEF DESCRIPTION OF THE DRAWINGS

These and/or other aspects will become apparent and more readily appreciated from the following drawings, which taken in conjunction with the specification of the present application, serve to explain the principles of the present disclosure.

FIG. 3a is a front view of a wireless power transfer apparatus, in accordance with one embodiment.

FIG. 3b is a cross-sectional view of the wireless power transfer apparatus of FIG. 3a taken along line 3b-3b of FIG. 3a.

FIG. 3c is a side view of the wireless power transfer apparatus of FIG. 3a.

FIG. 3d is a cross-sectional view of the wireless power transfer apparatus of FIG. 3a. The selected viewing angle of the cross-section is identified by line 3d-3d in FIG. 3c.

Figure 1:
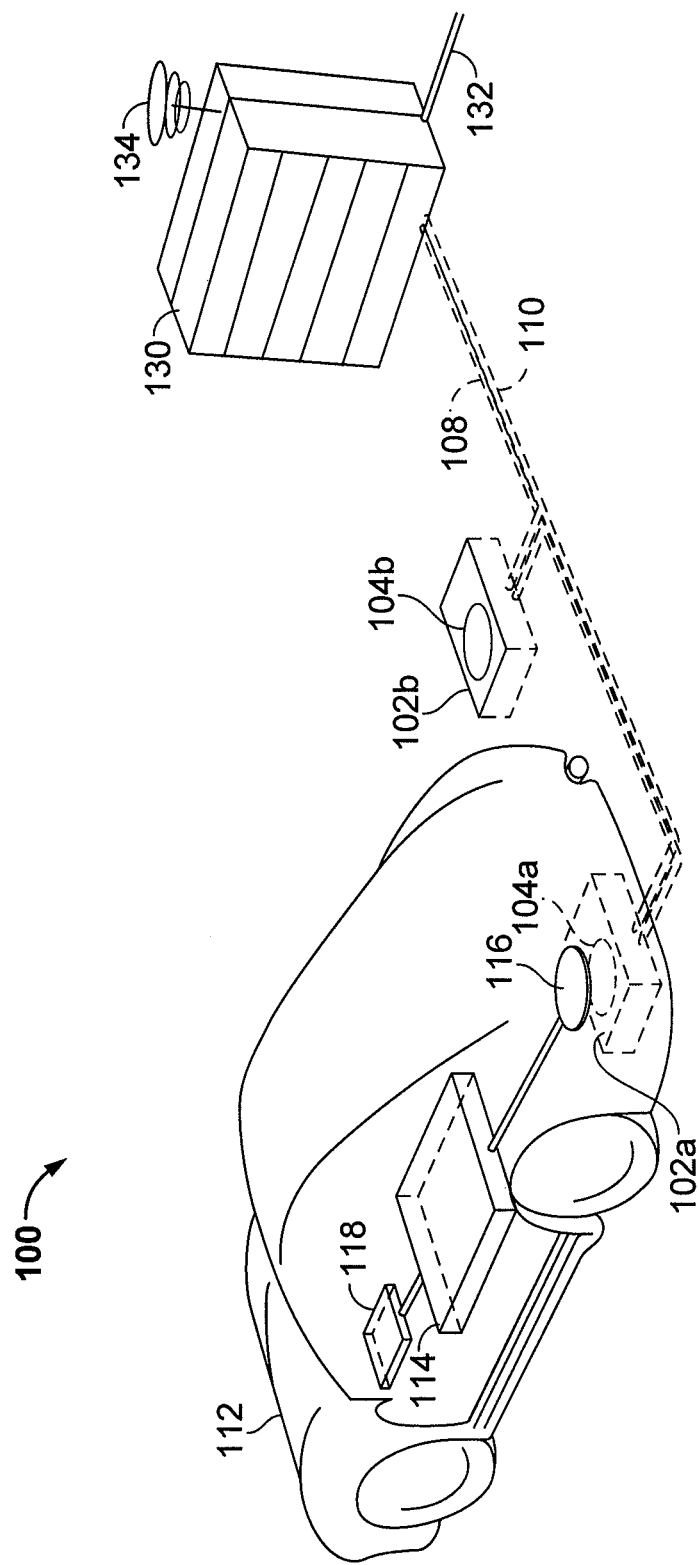
FIG. 1 is a perspective view of an exemplary wireless power transfer system for charging an electric vehicle, in accordance with an exemplary embodiment.

The various features illustrated in the drawings may not be drawn to scale. Accordingly, the dimensions of the various features may be arbitrarily expanded or reduced for clarity. In addition, some of the drawings may not depict all of the components of a given system, method or device.

DETAILED DESCRIPTION OF CERTAIN EMBODIMENTS

In the following detailed description, reference is made to the accompanying drawings, which form a part of the present disclosure. In the drawings, similar symbols typically identify similar components, unless context dictates otherwise. The illustrative embodiments described in the detailed description, drawings, and claims are not meant to be limiting. The detailed description set forth below in connection with the appended drawings is intended as a description of exemplary embodiments and is not intended to represent the only embodiments which may be practiced. The term "exemplary" used throughout this description means "serving as an example, instance, or illustration," and should not necessarily be construed as preferred or advantageous over other embodiments. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

The terminology used herein is for the purpose of describing particular embodiments only and is not intended to be limiting of the disclosure. It will be understood by those within the art that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received by, captured by, or coupled by a "receiving coil" to achieve power transfer. Accordingly, the terms "wireless" and "wirelessly" are used to indicate that power transfer between charging station and remote system is achieved without use of a cord-type electric conductor therebetween.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices, mobile phones, and the like).

FIG. 1 is a diagram of an exemplary wireless power transfer system 100 for charging an electric vehicle 112, in accordance with an exemplary embodiment. The wireless power transfer system 100 enables charging of an electric vehicle 112 while the electric vehicle 112 is parked near a base wireless charging system 102a. Charging spaces for two electric vehicles are illustrated in a parking area. Each charging space is configured such that an electric vehicle can drive into the charging space and park over a base wireless charging system, such as base wireless charging systems 102a and 102b. In some embodiments, a local distribution center 130 may be connected to a power backbone 132 and configured to provide an alternating current (AC) or a direct current (DC) supply through a power link 110 to the base wireless charging system 102b. The power link may be an electric cable, cord, wire, or other device for transporting power along a distance. In some embodiments, power backbone 132 supplies power via power link 110 to one base wireless charging system; in other embodiments, the power backbone 132 may supply power via power link 110 to two or more base wireless charging systems. Thus, in some embodiments, power link 110 extends beyond base wireless charging system 102b, delivering power to additional base wireless charging systems, such as base wireless charging system 102a. While the description hereinafter refers to base wireless charging system 102a and its various components, the description is also applicable to base wireless charging system 102b and to any additional base wireless charging systems included within a wireless power transfer system 100.

Local distribution 130 may be configured to communicate with external sources (e.g., a power grid) via a communication backhaul 134, and with all base wireless charging systems, such as, for example, base wireless charging systems 102a via a communication link 108. Communication link 108 may include one or more cables or other devices for transporting signals along a distance.

The base wireless charging system 102a of various embodiments includes a base system induction coil 104a for wirelessly transferring or receiving power. When an electric vehicle 112 is within range of the base wireless charging system 102a, power may be transferred between the base wireless induction coil 104a and an electric vehicle induction coil 116 within the electric vehicle 112. In some embodiments, power may be transmitted from the base wireless induction coil 104a to the electric vehicle induction coil 116. Power received by the electric vehicle induction coil 116 can then be transported to one or more components within the electric vehicle 112 to provide power to the electric vehicle 112. Such components within the electric vehicle 112 include, for example, a battery unit 118 and an electric vehicle wireless charging system 114.

In some exemplary embodiments, the electric vehicle induction coil 116 is said to be within range of, and may receive power from, the base system induction coil 104a when the electric vehicle induction coil 116 is located within a target region of the electromagnetic field generated by the base system induction coil 104a. The target region corresponds to at least part of a region where energy output by the base system induction coil 104a may be captured by an electric vehicle induction coil 116. In some cases, the target region may correspond to the "near-field" of the base system induction coil 104a. The near-field is at least part of the electromagnetic field produced by the base system induction coil 104a. The near-field may correspond to a region in which there are strong reactive fields that result from the currents and charges in the base system induction coil 104a and that do not radiate power away from the base system induction coil 104a. In some cases, the near-field may correspond to a region that is within approximately $\frac{1}{2\pi}$ of the wavelength of the base system induction coil 104a. Additionally, in various embodiments, described in more detail below, power may be transmitted from the electric vehicle induction coil 116 to the base system induction coil 104a. In such embodiments, the near-field may correspond to a region that is within approximately $\frac{1}{2\pi}$ of the wavelength of the electric vehicle induction coil 116.

In various embodiments, aligning the electric vehicle induction coil 116 such that it is disposed within the near-field region of the base system induction coil 104a may advantageously improve or maximize power transfer efficiency. In some embodiments, the electric vehicle induction coil 116 may be aligned with the base system induction coil 104a, and therefore, disposed within the near-field region simply by the driver properly aligning the electric vehicle 112 relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations, thereby improving convenience to a user. There may also be no exposed electrical contacts and no mechanical wear out, thereby improving reliability of the wireless power transfer system 100. Manipulations with cables and connectors can be avoided, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
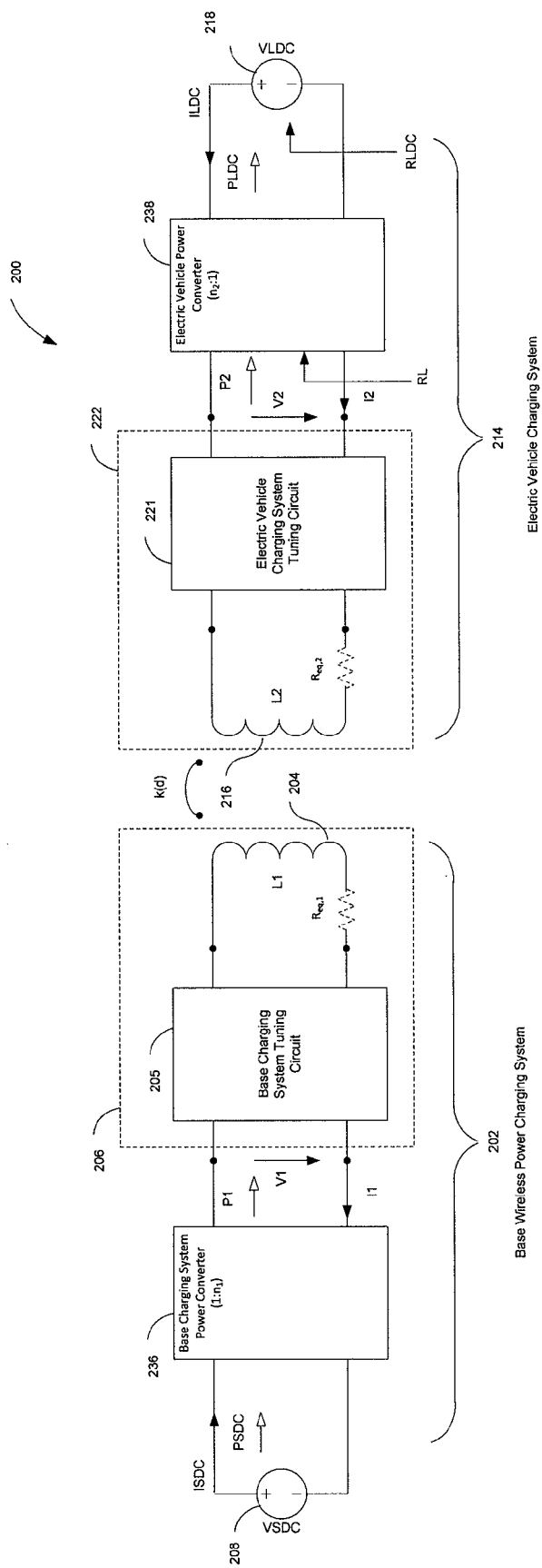
FIG. 2 is a schematic diagram of exemplary components of the wireless power transfer system of FIG. 1.

FIG. 2 is a schematic diagram of exemplary components of the wireless power transfer system 100 of FIG. 1. As shown in FIG. 2, the wireless power transfer system 200 may include a base wireless power charging system 202, which includes a base system transmit circuit 206 having a base system induction coil 204 with an inductance $L_1$. The wireless power transfer system 200 further includes an electric vehicle charging system, which includes an electric vehicle receive circuit 222 having an electric vehicle induction coil 216 with an inductance $L_2$.

Certain embodiments described herein may use capacitively loaded wire loops (i.e., multi-turn coils) to form a resonant structure that is capable of efficiently coupling energy from a primary structure (transmitter) to a secondary structure (receiver) via a magnetic or electromagnetic near-field if both primary and secondary are tuned to a common resonant frequency. In some such embodiments, the electric vehicle induction coil 216 and the base system induction coil 204 may each comprise multi-turn coils. Using resonant structures for coupling energy may be referred to as "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112.

The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206, including to a base charging system tuning circuit 205 which may include reactive tuning components in a series or parallel configuration or a combination of both and the base system induction coil 204, to emit an electromagnetic field at a desired frequency. In one embodiment, a capacitor may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206, including base system induction coil 204, and the electric vehicle receive circuit 222, including electric vehicle induction coil 216, may be tuned to substantially the same frequencies and may be positioned within the near-field of an electromagnetic field transmitted by one of the base system induction coil 204 and the electric vehicle induction coil 216. In this case, the base system induction coil 204 and electric vehicle induction coil 216 may become coupled to one another through the electromagnetic field therebetween such that power may be transferred to the electric vehicle receive circuit 222, including to an electric vehicle charging system tuning circuit 221 and electric vehicle induction coil 216. The electric vehicle charging system tuning circuit 221 may be provided to form a resonant circuit with the electric vehicle induction coil 216 so that electric vehicle induction coil 216 resonates at a desired frequency. The mutual coupling coefficient resulting at coil separation is represented by element k(d). Equivalent resistances $R_{eq,1}$ and $R_{eq,2}$ represent the losses that may be inherent to the induction coils 204 and 216 and any anti-reactance capacitors that may, in some embodiments, be provided in the base charging system tuning circuit 205 and electric vehicle charging system tuning circuit 221 respectively. The electric vehicle receive circuit 222, including the electric vehicle induction coil 216 and electric vehicle charging system tuning circuit 221, receives power $P_2$ from the base wireless power charging system 202 via the electromagnetic field between induction coils 204 and 216. The electric vehicle receive circuit 222 then provides the power $P_2$ to an electric vehicle power converter 238 of an electric vehicle charging system 214 to enable usage of the power by the electric vehicle 112.

The electric vehicle power converter 238 may include, among other things, an LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of a battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 202 (acting as a transmitter), which may be used to decouple the electric vehicle charging system 214 (acting as the receiver) from the base wireless charging system 202. The load changes may be detected if the transmitter includes the load sensing circuit. Accordingly, the transmitter, such as a base wireless charging system 202, may have a mechanism for determining when receivers, such as an electric vehicle charging system 214, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 216 are configured according to a mutual resonant relationship such that the resonant frequency of the electric vehicle induction coil 216 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near-field of a transmitting induction coil to a receiving induction coil rather than propagating most of the energy in an electromagnetic wave beyond the near-field. When in the near-field, a coupling mode may be established between the transmit induction coil and the receive induction coil. The area around the induction coils where this near-field coupling may occur is referred to herein as a near-field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204, as described throughout the disclosed embodiments, may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy for coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferrimagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near-field of the transmitting induction coil to the receiving induction coil residing within a region (e.g., within a predetermined frequency range of the resonant frequency, or within a predetermined distance of the near-field region) where this near-field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non limiting example, a capacitor (not shown) may be added in series with the induction coil (e.g., induction coil 204) to create a resonant circuit (e.g., the base system transmit circuit 206) that generates an electromagnetic field. Accordingly, for larger diameter induction coils, the value of capacitance for inducing resonance may decrease as the diameter or inductance of the coil increases. Inductance may also depend on a number of turns of an induction coil. Furthermore, as the diameter of the induction coil increases, the efficient energy transfer area of the near-field may increase. Other resonant circuits are possible. As another non-limiting example, a capacitor may be placed in parallel between the two terminals of the induction coil (e.g., a parallel resonant circuit). Furthermore an induction coil may be designed to have a high quality (Q) factor to improve the resonance of the induction coil.

As described above, according to some embodiments, coupling power between two induction coils that are in the near-field of one another is disclosed. As described above, the near-field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near-field amplitudes in practical embodiments tend to be higher for magnetic type coils in comparison to the electric near-fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
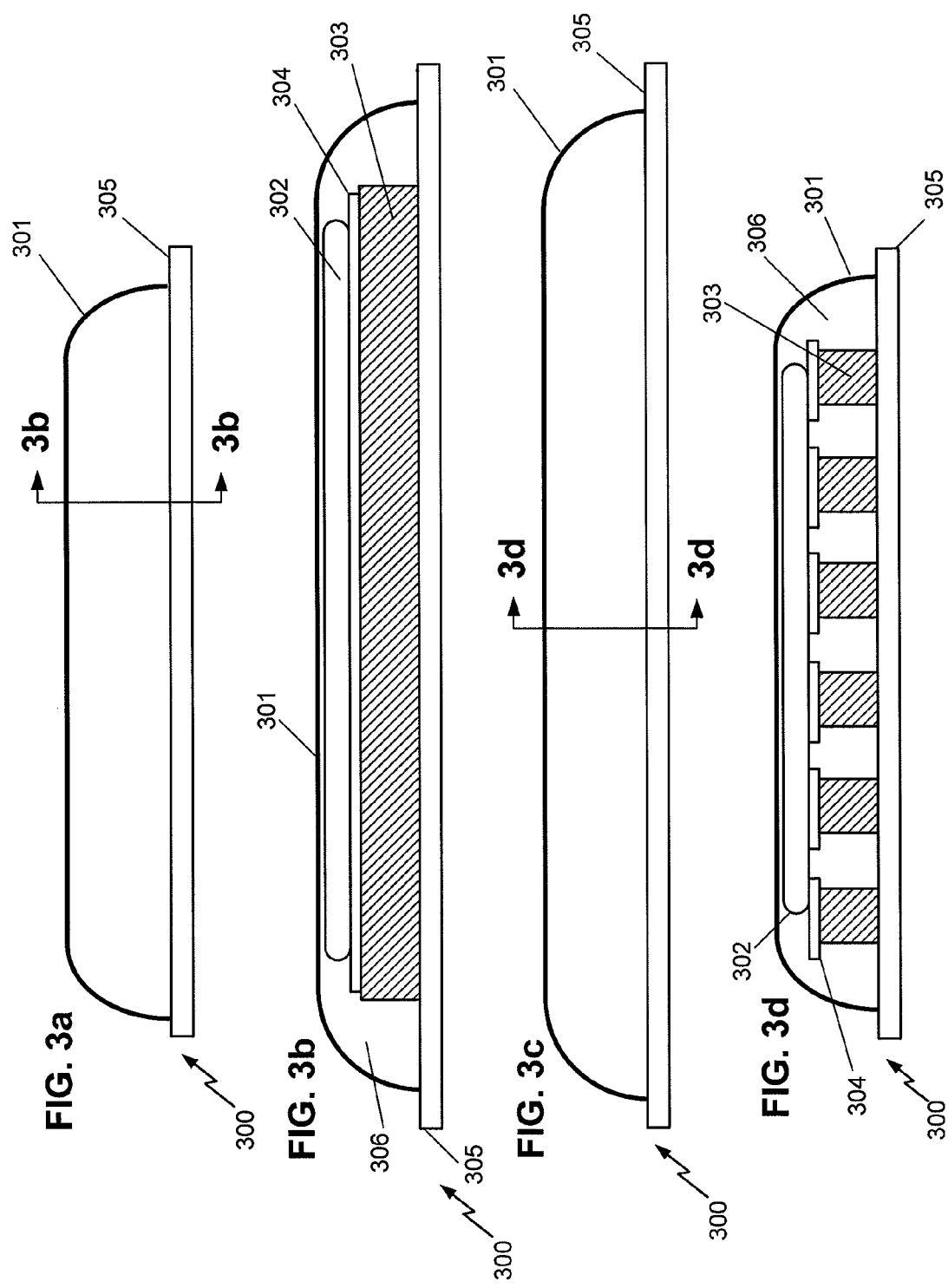

FIG. 3a depicts a front view, FIG. 3c shows a side view, and FIG. 3b and FIG. 3d show cross-sectional views of an exemplary construction of modules containing the respective induction coils 116 and 104a of FIG. 1, or the base system transmit circuit 206 or electric vehicle receive circuit 222 of FIG. 2. These modules may herein be described generically as wireless power transfer devices.

The wireless power transfer device 300 of FIG. 3a through FIG. 3d comprises a casing formed of a first casing portion 301 and a second casing portion 305, which may alternatively be referred to as a backing plate. First casing portion 301 may be made of any suitable durable material, although in certain embodiments the casing may be made of a rigid or semi-rigid plastic material or other plastic or composite material, for example, polyethylene. Polyethylene may provide impact resistant properties together with a chemical resistance and watertightness which may be suitable for maintaining integrity of the casing in the face of exposure to the range of conditions the wireless power transfer device 300 is likely to experience. Polyethylene can also withstand relatively high temperatures without warping, which may be useful with regard to maintaining the shape of the casing both during manufacture and also in use within environments which experience high temperatures. A medium density polyethylene (MDPE) may provide a relatively inexpensive material for the casing which may also be readily machined. A high density polyethylene (HDPE) may be more easily machined, but could add to the cost of the device 300. It should be appreciated that while polyethylene is discussed as having properties which lend it to being a suitable material for the casing, this is not intended to be limiting. A person skilled in the art should appreciate that other materials may be used—whether a plastic or otherwise.

A second casing portion or backing plate 305 may be connected to first casing portion 301 to form a chamber to house the components and provide additional mechanical strength to the device 300. The backing plate 305 may act as a mounting surface, for example in the case where the wireless power transfer device 300 is the pick-up of an electric vehicle (see for example induction coil 116 of FIG. 1). The backing plate 305 may be made of a conductive material such as, for example, aluminum, copper, or other conductive metal or conductive composite, in order to act as an electromagnetic shield, thus channeling more of the magnetic flux in the direction of the other induction coil in the wireless power transfer system.

As shown in FIG. 3b and FIG. 3d, the wireless power transfer device 300 further comprises an induction coil 302, positioned within the first casing portion 301. In one embodiment the coil 302 may be formed from one or more lengths of conducting material, for example Litz wire.

Ferromagnetic antenna cores or magnetically permeable members, provided in FIG. 3b and FIG. 3d by ferromagnetic blocks 303 may be positioned in parallel alignment within the wireless power transfer device 300. Ferromagnetic blocks 303 are made of a material capable of supporting the formation of a magnetic field within itself, such as, for example, ferrite. The ferromagnetic blocks 303 may be included within the wireless power transfer device 300 to strengthen formation of an electromagnetic field. Ferromagnetic blocks 303 may be separated from the induction coil 302 by an insulating layer 304 to provide electrical separation between the coil 302 and ferromagnetic blocks 303. The insulating layer 304 may be formed of, for example, enamel, polyurethane, rubber, silicone, other insulating composite materials, or any other suitable insulating material known to those skilled in the art. In some embodiments, a layer of material may additionally or alternatively be added to provide physical protection to the coil from the potentially sharp edges of the ferromagnetic blocks 303. Any suitable material may be used to provide physical protection, such as, for example, a malleable, deformable, gel-like, or gelatinous material. In some embodiments, polyurethane, rubber, silicone, or other soft composite materials are used.

The first casing portion 301 may be filled or potted with a settable flowable medium in the form of epoxy resin 306. In one exemplary embodiment, the epoxy resin 306 is a marine grade epoxy with a working viscosity of approximately 725 centipoise. It should be appreciated that this example is not intended to be limiting, and that other suitable settable flowable mediums known to a person skilled in the art may be implemented with certain various embodiments. Reference to a settable flowable medium should be understood to mean any material which may be spread in a fluid manner prior to undergoing a setting process to form a solid. It should be appreciated that the unset flowable medium may include both solid and liquid components—for example solid fibers or particles within a liquid resin.

When set, the epoxy 306 may provide reinforcement within the interior of the casing. This may result in improved mechanical strength to the wireless power transfer apparatus 300, particularly in terms of resistance to impact—whether by a vehicle running over a ground-based device, or rocks and other debris striking a device mounted to a vehicle. These compression forces may be more evenly distributed across and resisted by the set epoxy 306, as opposed to purely by the first casing portion 301, the outer surface of which, in use, is the part of the wireless power transfer apparatus that is first exposed to the external compression forces.

Further, by encasing the induction coil 302 and ferromagnetic blocks 303, the epoxy 306 may provide a waterproofing effect, which is highly desirable in order to assist in enabling the wireless power transfer device 300 to be safely used in wet conditions.

Also, by encasing the ferromagnetic blocks 303 within the epoxy 306, the effects on the electrical characteristics of the wireless power transfer device 300 may be minimized in the event that one or more of the ferromagnetic blocks 303 are cracked. This may be inevitable for devices placed in or on the ground where vehicles can pass over them. The epoxy 306 may serve to substantially hold the form of the blocks 303 such that the properties of the blocks 303, for the purposes of operation of the wireless power transfer device 300, are maintained.

The epoxy 306 may act as an electrical insulator between components within the casing. Further, the epoxy 306 may also improve thermal conductivity of the wireless power transfer device 300 in order to assist with reducing heating of the device 300 during operation.

Figure 4:
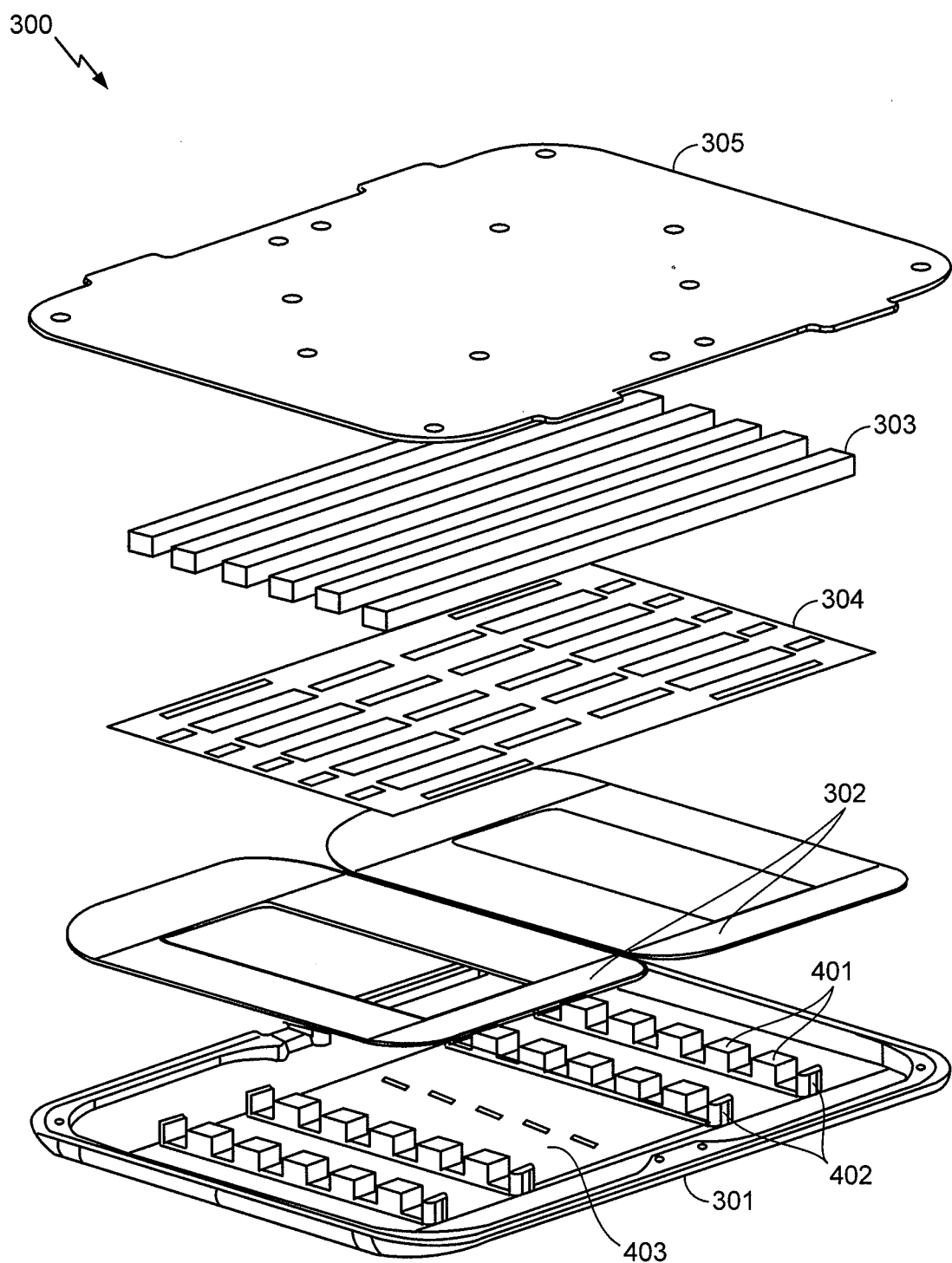
FIG. 4 is an exploded isometric view of the wireless power transfer apparatus embodiment shown in FIG. 3a and FIG. 3b.
Figure 5:
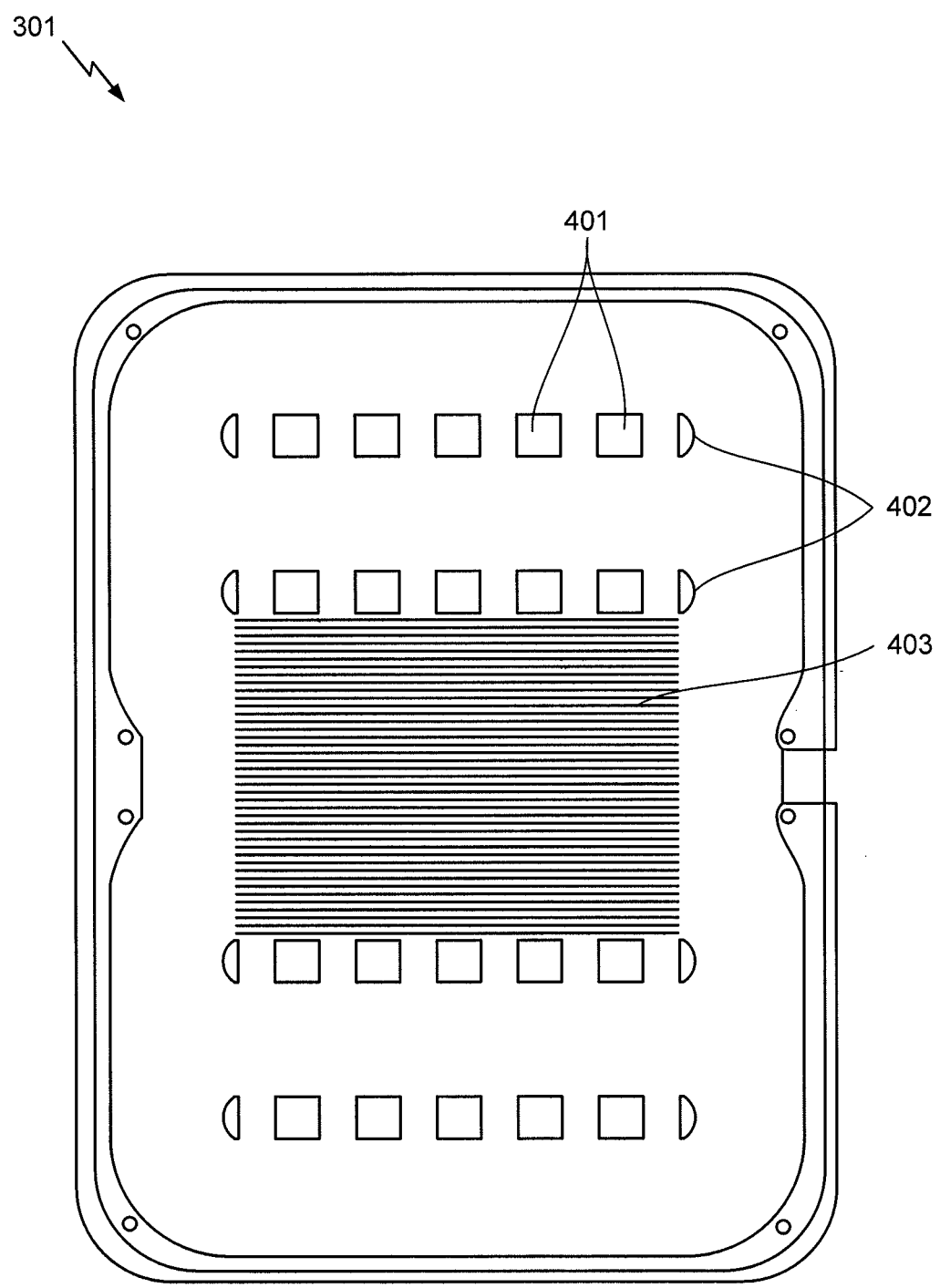
FIG. 5 is a top plan view of a portion of the wireless power transfer apparatus embodiment shown in FIG. 3a, FIG. 3b and FIG. 4.

FIG. 4 is an exploded isometric view of the exemplary wireless power transfer apparatus 300 shown in FIG. 3a through FIG. 3d. The orientation of the apparatus in FIG. 4 is upside-down compared to the orientation of the apparatus in FIG. 3a through FIG. 3d. FIG. 4 is generally indicative of a method of assembling a wireless power transfer apparatus according to an embodiment, in which components of the apparatus are positioned inside first casing portion 301 before second casing portion 305 is connected to the first casing portion 301 to house the components inside the casing, as will be explained further below. FIG. 5 is a plan view of the first casing portion 301 shown in FIG. 3a, through FIG. 4.

As shown in FIG. 4, first casing portion 301 comprises a surface having an inner and outer side to it. The first casing portion 301 also comprises at least one projecting member projecting outwards from the inner side of this surface. In the embodiment shown in FIG. 4, first casing portion 301 comprises a plurality of projecting members in the form of pillars 401. The pillars 401 of FIG. 4 are shaped as rectangular prisms. In other embodiments, other pillar shapes, such as cylinders or triangular prisms may be used. The pillars of some embodiments have a uniform thickness along the length of the pillar; in other embodiments, the pillars may be tapered such that they are widest at their base. In other embodiments, other projecting member designs, such as, for example, projecting walls, may be used.

In certain embodiments, pillars 401 are integrally formed with first casing portion 301. In one example, first casing portion 301 is formed from a moldable plastic or composite material, such as, for example, polyethylene, and pillars 401 are formed during the molding of the first casing portion. In alternative embodiments, the projecting member(s) may be connected to the inner side of the surface of first casing portion 301 by any suitable connection method and may be formed from any material that enables the pillars to withstand the compression forces that are likely to be applied to the wireless power transfer apparatus in use, for example when run over by a large vehicle.

Ignoring point loads, a large truck may exert approximately 100 psi or 690 kPa of pressure on the ground through its wheels. In various embodiments, the wireless power transfer apparatus is designed to withstand such pressure, or even larger pressures to allow margin for error or unexpectedly large loads. A suitable material for the pillars and casing can therefore be selected as appropriate. Plastics materials such as polyethylene are particularly advantageous because they are elastically deformable under compression, thus absorbing a large amount of the impact energy.

When placed under load, the pillars 401 should not deform to such an extent that other components within the apparatus are placed under a load they are incapable of bearing. The appropriate selection of pillar material may therefore depend on the strength and size of the other materials inside the apparatus.

The amount of deformation allowed without causing damage to the apparatus may also depend on the material used to fill or pot the casing. For example, one embodiment may comprise epoxy resin filler that contains silica beads. Another may comprise fiber-reinforced epoxy resin filler. The embodiment with the silica beads is able to withstand less deformation than the embodiment with the fiber-reinforced epoxy resin filler.

The pillars 401 are generally of sufficient number and of sufficient width to effectively distribute the compressive force from the surface of the first casing portion 301 through the apparatus to the back plate 305 without significant and damaging warping. The distribution and arrangement of pillars 401 are also important, and they may be distributed over a wide area through the apparatus. In one embodiment, the apparatus comprises 28 pillars, each having width and/or length dimensions of approximately 20-100 mm and a height of similar magnitude. It will be understood that the number, arrangement and size of pillars 401 will vary depending on the materials used and the loads that the apparatus is required to withstand.

When a compressive load is applied to the wireless power transfer apparatus 300, the largest bending moments on the first casing portion relative to the side walls are imparted in the middle of the surface of the first casing portion 301. Therefore, some of the pillars 401 may be positioned in the middle of the first casing portion 301. However, in some embodiments, such as that illustrated in FIG. 4 and FIG. 5, the use of a double coil prevents pillars from being positioned in the center of the first casing portion. In such embodiments, the pillars 401 should be positioned as close as possible to the center or at least spaced so the distance between pillars is such that the largest bending moment that is likely to be applied in use to any given point on the surface of the first casing portion 301 is able to be withstood.

To assemble the wireless power transfer apparatus 300, at least one induction coil 302 is positioned inside first casing portion 301 in the desired position. The induction coil(s) 302 may comprise any arrangement of lengths of conducting material. In the embodiments shown in FIG. 4, two induction coils 302 formed of Litz wire are introduced into the casing.

Pillars 401 may be arranged to assist in the positioning of other components within the casing of the wireless power transfer device. For example, the induction coil 302 may be positioned around pillars 401 to assist in maintaining the shape of the induction coil 302 in use. Where lengths of conducting material are laid down in the desired coil arrangement in first casing portion 301 (as opposed to being coiled prior to the coil being positioned inside the casing), the lengths of conducting material may be physically wound around the pillars 401. This may ease the task of laying out the coils of conducting material and ensure the coils maintain the desired shape as they are formed. One or more of the pillars may have rounded edges to reduce the risk of damaging the delicate Litz wire used to form the induction coils 302. For example, in the embodiment of FIG. 4 and FIG. 5, pillars 402 having rounded sides are positioned at the end of each row of pillars where the Litz wire is wound around a corner.

The inner side of first casing portion 301 may comprise a plurality of grooves 403 that are positioned to receive individual strands of Litz wire that comprise the induction coils 302. This aids in laying out the coils and ensures the windings are correctly spaced.

Insulating layer 304 is positioned inside first casing portion 301 on top of induction coils 302, assuming for purposes of this example, an orientation in which the surface of the first casing portion 301 is positioned below the induction coil 302. Insulating layer 304 may be formed of one or more separate components although fewer components generally results in easier assembly. Insulating layer 304 may comprise a plurality of holes positioned to allow pillars 401 to pass through the holes when the insulating layer 304 is placed on top of coils 302. In such an arrangement, the insulating layer 304 is held in position by the pillars 401.

Next, assuming the same orientation as the previous paragraph, ferromagnetic blocks 303 are positioned on top of insulating layer 304 and between rows of pillars 401: The pillars 401 ensure the ferromagnetic blocks 303 are kept in parallel alignment with each other and also ensure the ferromagnetic blocks 303 are held in position relative to insulating layer 304, thereby maintaining the electrical and physical separation of the induction coils 302 from the ferromagnetic blocks 303.

The epoxy resin 306 is introduced into first casing portion 301 and allowed to cure before the second casing portion or backing plate 305 is connected to the first casing portion 301.

In certain embodiments, at least one of pillars 401 (and in some embodiments, all pillars 401) has sufficient height to abut against second casing portion 305 when it is connected to first casing portion 301. As a result, compression forces applied to the outer surface of first casing portion 301 are transmitted through the pillars 401 to the back plate 305. Depending on the materials used, the pillars may compress slightly or the relative spacing of the outer surfaces of the first and second casing portions may be maintained. This ensures the apparatus has a high degree of strength against compression forces and the casing has a low likelihood of cracking or breaking and exposing the components housed within to the elements.

It will be appreciated that, in embodiments in which the pillars 401 do not have sufficient length to abut against the second casing portion 305, the casing is still able to resist considerable compressive force. Compressive force exerted on the surface of the first casing portion 301 will cause the first casing portion 301 to deform in the direction of the second casing portion 305, particularly in the middle. When sufficient force is applied, the first casing portion 301 may deform to the extent that the pillars 401 abut the inner side of the second casing portion 305. Further force will cause the pillars 401 to deform in compression. Provided the first casing portion 301 is resistant to cracking or breaking with this amount of deformation, the strengthening benefits of the pillars 401 are still realized. In addition, where the pillars 401 are integrally formed with the first casing portion 301, the pillars 401 correspond to areas of the first casing portion 301 with increased thickness compared to the rest of the first casing portion. The first casing portion 301 therefore has a higher average thickness compared to if the pillars 401 were not present, increasing the strength of the casing.

While the advantages of the embodiments illustrated in FIG. 3a, FIG. 3b, FIG. 3c, FIG. 3d, FIG. 4 and FIG. 5 have been particularly described in relation to a base or transmitting induction coil module in a wireless power transfer system since such modules may be placed on the ground where they are susceptible to large compressive forces, it will be understood that the electric vehicle or receiving coil module may be constructed in a similar manner. Induction coil modules mounted on electric vehicles may also be subject to compressive forces, such as when impacted by bumps on the ground, loose particles or other vehicles and it is desirable that the induction coil module on the vehicle is able to withstand such impacts.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

For purposes of summarizing the disclosure, certain aspects, advantages and features have been described herein. It is to be understood that not necessarily all such advantages may be achieved in accordance with any particular embodiment. Thus, the invention may be embodied or carried out in a manner that achieves or optimizes one advantage or group of advantages as taught herein without necessarily achieving other advantages as may be taught or suggested herein.

While this invention has been described in connection with what is are presently considered to be practical embodiments, it will be appreciated by those skilled in the art that various modifications and changes may be made without departing from the scope of the present disclosure. It will also be appreciated by those of skill in the art that parts mixed with one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the invention is not limited to the disclosed embodiments, but, on the contrary, is intended to cover various modifications and equivalent arrangements included within the scope of the appended claims, and equivalents thereof.

What is claimed is:

1. A wireless power transfer apparatus comprising:
  a first casing portion having a wall with a plurality of projecting members extending from an inner surface of the wall and distributed across at least a portion of the inner surface of the wall, the projecting members comprising elastically deformable plastic that deforms when a compressive force is applied to the first casing portion;
  a coil configured to wirelessly receive or transmit power, the coil extending around the projecting members;
  a second casing portion connected to the first casing portion to form a chamber within which the coil is housed; and
  a potting material disposed to fill the chamber formed by the first and second casing portions.

2. The wireless power transfer apparatus of claim 1, wherein the wall of the first casing portion is configured to withstand external compression forces.

3. The wireless power transfer apparatus of claim 1, wherein at least one of the projecting members abuts an inner surface of the second casing portion and comprises a material able to withstand external compression forces applied to the wall of the first casing portion.

4. The wireless power transfer apparatus of claim 1, wherein at least one of the projecting members and an inner surface of the second casing portion come into contact when the wall of the first casing portion deforms under a compression force.

5. The wireless power transfer apparatus of claim 1, wherein at least one of the projecting members is integrally formed with the wall of the first casing portion.

6. The wireless power transfer apparatus of claim 1, wherein the coil is wound around at least one of the projecting members.

7. The wireless power transfer apparatus of claim 1, wherein at least one of the projecting members comprises a pillar.

8. The wireless power transfer apparatus of claim 1, further comprising a component located within the chamber and held in position by at least one of the projecting members.

9. The wireless power transfer apparatus of claim 8, wherein the component is selected from the group comprising: a magnetically permeable member, an electrically insulating member, or a physical protection member.

10. A method of manufacturing a wireless power transfer apparatus comprising:
providing a first casing portion having a wall with a plurality of projecting members extending from an inner surface of the wall and distributed across at least a portion of the inner surface of the wall, the projecting members comprising elastically deformable plastic that deforms when a compressive force is applied to the first casing portion;
positioning a coil around the plurality of projecting members, the coil configured to wirelessly receive or transmit power and the wall configured to withstand external compression forces;
connecting a second casing portion to the first casing portion to form a chamber within which the coil is housed, and
disposing a potting material within the chamber formed by the first and second casing portions.

11. The method of claim 10, wherein positioning the coil around the plurality of projecting members comprises winding a length of conducting material around one or more of the projecting members.

12. The method of claim 10, further comprising positioning a component on top of the coil such that the component is held in position by one or more of the projecting members before connecting the second casing portion to the first casing portion.

13. A wireless power transfer apparatus comprising:
first casing means for defining a portion of a chamber, the first casing means having an inner surface;
a plurality of means for providing internal structural support located on and projecting from the inner surface of the first casing means and distributed across at least a portion of the inner surface of the first casing means, the plurality of means for providing internal structural support comprising elastically deformable plastic that deforms when a compressive force is applied to the first casing means;
means for conveying electric current, wherein the means for conveying electric current is positioned to extend around the plurality of means for providing internal structural support and is configured to wirelessly receive or transmit power;
second casing means for defining a further portion of the chamber, the second casing means secured to the first casing means to form the chamber for housing the means for conveying electric current; and
means for potting disposed inside the chamber formed by the first and second casing means.

14. The wireless power transfer apparatus of claim 13, wherein at least one of the means for providing internal structural support abuts an inner surface of the second casing means at least when an external compression force applied to an outer surface of the first casing means causes the first casing means to deform, and wherein the means for providing internal structural support is configured to withstand external compression forces applied to the outer surface of the first casing means.

15. The wireless power transfer apparatus of claim 13, wherein at least one of the means for providing internal structural support is integrally formed with the first casing means.

16. The wireless power transfer apparatus of claim 13, wherein the means for conveying electric current is wound around at least one of the plurality of means for providing internal structural support.

17. The wireless power transfer apparatus of claim 13, further comprising a component held in position by at least one of the means for providing internal structural support.

18. The wireless power transfer apparatus of claim 17, wherein the component is selected from the group comprising: means for strengthening formation of an electromagnetic field, means for electrically insulating the means for conveying electric current, or means for physically protecting the means for conveying electric current.

19. The wireless power transfer apparatus of claim 1, wherein the combination of the potting material and projecting members is arranged to limit an amount of deformation of at least one of the projecting members under the compressive force; and
wherein the projecting members comprising elastically deformable plastic are replaced with projecting members comprising composite material.

20. The method of claim 10, further comprising arranging a combination of the potting material and the projecting members to limit an amount of deformation of at least one of the projecting members under the compressive force; and
wherein the projecting members comprising elastically deformable plastic are replaced with projecting members comprising composite material.

21. The wireless power transfer apparatus of claim 13, wherein the combination of the means for potting and the plurality of means for providing internal structural support is arranged to limit an amount of deformation of at least one of the plurality of means for providing internal structural support under the compressive force; and
wherein the plurality of means for providing internal structural support comprising elastically deformable plastic are replaced with a plurality of means for providing internal structural support comprising composite material.

22. The method of claim 10, wherein at least one of the plurality of projecting members abuts an inner surface of the second casing portion and comprises a material able to withstand external compression forces applied to the wall of the first casing portion.

* * * * *